United States Patent

Claus et al.

[11] Patent Number: 5,857,079
[45] Date of Patent: Jan. 5, 1999

[54] SMART CARD FOR AUTOMATIC FINANCIAL RECORDS

[75] Inventors: David Michael Claus, Indianapolis, Ind.; John Christian Moran, Thornton, Colo.; Kevin Dean Murphy; Wanda Green Thompson, both of Indianapolis, Ind.

[73] Assignee: Lucent Technologies Inc., Murray Hill, N.J.

[21] Appl. No.: 372,797

[22] Filed: Dec. 23, 1994

[51] Int. Cl.$^6$ ..................................................... G06F 17/60
[52] U.S. Cl. .............................. 704/33; 235/380; 395/241
[58] Field of Search .................................... 364/401, 406, 364/408; 235/379, 380; 395/201, 233, 241

[56] References Cited

U.S. PATENT DOCUMENTS

| | | | |
|---|---|---|---|
| 4,634,845 | 1/1987 | Hale | 235/380 |
| 4,689,478 | 8/1987 | Hale | 235/380 |
| 4,797,898 | 1/1989 | Martinez | 375/7 |
| 4,798,722 | 1/1989 | Edman et al. | 424/72 |
| 4,802,080 | 1/1989 | Bossi et al. | 363/75 |
| 5,233,547 | 8/1993 | Kapp et al. | 364/705.02 |
| 5,521,363 | 5/1996 | Tannenbaum | 235/379 |
| 5,530,232 | 6/1996 | Taylor | 235/380 |
| 5,559,313 | 9/1996 | Claus et al. | 235/380 |
| 5,578,808 | 11/1996 | Taylor | 235/380 |
| 5,590,038 | 12/1996 | Pitroda | 395/241 |

*Primary Examiner*—Gail O. Hayes
*Assistant Examiner*—Steven R. Yount

[57] ABSTRACT

A smart card that allows for the categorization of expenses at the time they are incurred and the automatic generation and storage of information concerning the date, payee, and amount of the transaction. A single smart card is utilized to record and categorize transactions as they occur by transaction identities. These transaction identities are business or personal classification, cash, check, or credit card type transactions, and expense categories. The smart card has a alphanumeric display and a keyboard for selecting the class, type, and category. These items are selected by the entry of numbers on the keyboard but textual information is displayed to identify these items in response to the entered numbers. A program in a personal computer is used to specify the class, type, and categories along with the textual information in the smart card via a smart card reader. These specifications correspond to a spreadsheet that has been entered on the personal computer by the user of the smart card. The personal computer loads the textual information defining the class, type, and category into the smart card so that it corresponds to the titles of the entries on the spreadsheet.

8 Claims, 12 Drawing Sheets

FIG. 13

| | | | | | |
|---|---|---|---|---|---|
| ###PERSONAL | | | | | |
| ##CASH | | | | | |
| #GROCERIES | #VAC | #LUNCH | #ENTERTAIN | #CLOTHES | #MISC |
| $100 | $100 | $100 | $100 | $100 | $100 |
| ###PERSONAL | | | | | |
| ##CASH | | | | | |
| #GROCERIES | #VAC | #MORTGAGE | #ENTERTAIN | #CLOTHES | #MISC |
| $100 | $100 | $100 | $100 | $100 | $100 |
| 1301 ###PERSONAL | | | | | |
| 1302 ##CR-44444 | | | | | |
| 1303 #GROCERIES | #VAC | #MORTGAGE | #ENTERTAIN | #CLOTHES | #MISC |
| 1304 $100 | $100 | $100 | $100 | $100 | $100 |
| ###PERSONAL | | | | | |
| ##CR-123456 | | | | | |
| #LUNCH | #TICKETS | #ENTERTAIN | #MISC | | |
| $100 | $100 | $100 | $100 | | |
| ###BUSINESS | | | | | |
| ##CASH | | | | | |
| #TAXI | #DRINKS | #TIPS | | | |
| $100 | $100 | $100 | | | |

FIG. 14

```
         ###PERSONAL,,,,,
         ##CASH,,,,,
         #GROCERIES,#VAC.,#LUNCH,#ENTERAIN.,#CLOTHES,#MISC
         $100 ,$100 ,$100 ,$100 ,$100 ,$100
         ###PERSONAL,,,,,
         ##CHECK,,,,,
         #GROCERIES,#VAC.,#MORTGAGE,#ENTERAIN.,#CLOTHES,#MISC
         $100 ,$100 ,$100 ,$100 ,$100 ,$100
1401 —   ###PERSONAL,,,,,
1402 —   ##CR-44444,,,,,
1403 —   #GROCERIES,#VAC.,#MORTGAGE,#ENTERAIN.,#CLOTHES,#MISC
1404 —   $100 ,$100 ,$100 ,$100 ,$100 ,$100
         ###BUSINESS,,,,,
         ##CR-123456,,,,,
         #LUNCH,#TICKETS,#ENTERAIN.,#MISC.,,
         $100 ,$100 ,$100 ,$100 ,,
         ###BUSINESS,,,,,
         ##CASH,,,,,
         #TAXI,#DRINKS,#TIPS
         $100 ,$100 ,$100
```

SMART CARD FOR AUTOMATIC FINANCIAL RECORDS

TECHNICAL FIELD

This invention relates to the collection of financial information, and more particularly, it relates to the use of a smart card to categorize and store information received during a transaction.

BACKGROUND OF THE INVENTION

In trying to maintain personal budgets and business expense accounts, an individual experiences the problem of gathering data and inputting that data into a computer spreadsheet program or some other type of computer program. Once the data has been sorted by categories and entered into a spreadsheet program, an individual can quickly manipulate this data to obtain accurate financial pictures. Not only do the spreadsheets allow an individual to tabulate data but also allow the printing out of graphs that visually indicate where money is being spent.

People spend their money in one of three types of transactions: cash, check, and credit cards. In the case of both credit cards and checks, an individual has a paper record of the amount of the expenditure, date of expenditure, and with whom (payee) the expenditure was made. In addition, an individual can in their checkbook indicate the category of expense that the check was written for. In the case of a credit card, an individual can note on the credit card receipt the category for which the money was spent. When cash is utilized to pay an expense, an individual can write on the receipt received for the payment the category. Many individuals also have to classify expenditures as either personal or business. The key problem however is to enter this information into a spreadsheet program. Not only is the data entry time consuming and boring, it is also prone to mistakes. Because of this key problem, most people cannot accurately track their expenses with respect to specific categories.

Another problem that arises with the use of credit cards is the need to verify that the amounts detailed on the monthly statement have been correctly reported by the merchants or service providers. To ascertain, if these amounts are correct, the individual must match up each amount listed on the statement with the receipt obtained when the credit card was used. This is a particularly frustrating process because daily use of credit cards results in a large number of receipts. Further, receipts are often lost or misplaced since they are individual pieces of paper.

With respect to the use of checks, the monthly statement for the checks must be reconciled with the checkbook. Discrepancies between the net amount shown in the checking account by the statement and that shown by the checkbook are often due to incorrect entries in the checkbook or mistakes in arithmetic operations within the checkbook itself. These problems normally take time to find and correct.

A partial solution to these problems is set forth in U.S. Pat. No. 5,233,547 of M. A. Kapp, et al. This patent discloses an electronic checkbook which uses a digitizer to collect information concerning the date, the payee of the check, and the amount of the check as the check is being written. The patent also discloses the fact that reconciliation between the balance shown in the electronic checkbook and that shown on a check statement can be reconciled by using an automatic teller machine (ATM) or by connecting into the computer of a bank via a personal computer. The problem with the disclosed system is that it does not categorize the expenses for which the checks are written nor does it address the problem of the use of credit cards and cash.

SUMMARY OF THE INVENTION

The following problems are solved and an advance in the art is achieved by an apparatus and method that allow for the categorization of expenses at the time they are incurred and the automatic generation and storage of information concerning the date, payee, and amount of the transaction. A single smart card is utilized to record and categorize transactions as they occur by transaction identities. Advantageously, these transaction identities are business or personal classification, cash, check, or credit card type transactions, and expense categories.

The smart card has a alphanumeric display and a keyboard for selecting the class, type, and category. These items are selected by the entry of numbers on the keyboard but textual information is displayed to identify these items in response to the entered numbers. A program in a personal computer is used to specify the class, type, and categories along with the textual information in the smart card via a smart card reader. These specifications correspond to a spreadsheet that has been entered on the personal computer by the user of the smart card. The personal computer loads the textual information defining the class, type, and category into the smart card so that it corresponds to the titles of the entries on the spreadsheet.

In a second implementation, the smart card does not have a display or keyboard; and the class, type, and category information is entered from a POS terminal at the time of the expenditure. To simplify operations, the user has separate smart cards for each class (business or personal), and the category is specified by a POS operator entering the category number that is dictated by the user. The POS terminal already receives the type information from the POS clerk as part of normal operation.

BRIEF DESCRIPTION OF THE DRAWING

FIG. 13 illustrates a spreadsheet; and

FIG. 14 illustrates contents of a file that stores the spreadsheet of FIG. 13.

DETAILED DESCRIPTION

Figure 1:
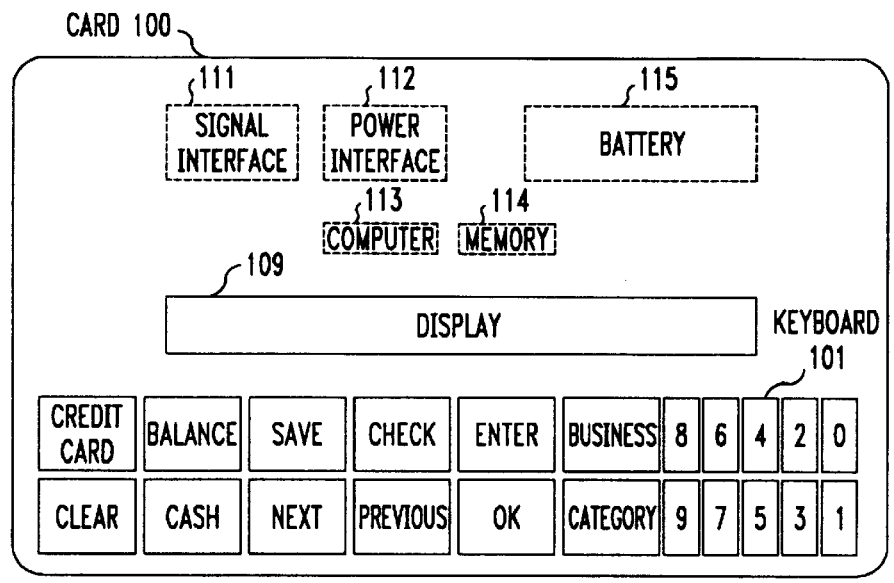
FIG. 1 illustrates a pictorial view of the smart card.
Figure 4:
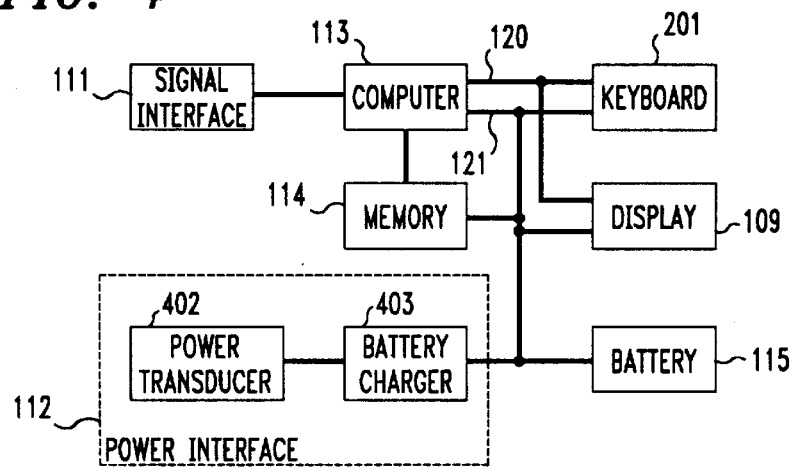
FIG. 4 illustrates, in block diagram form, the circuitry of the smart card.
Figure 3:
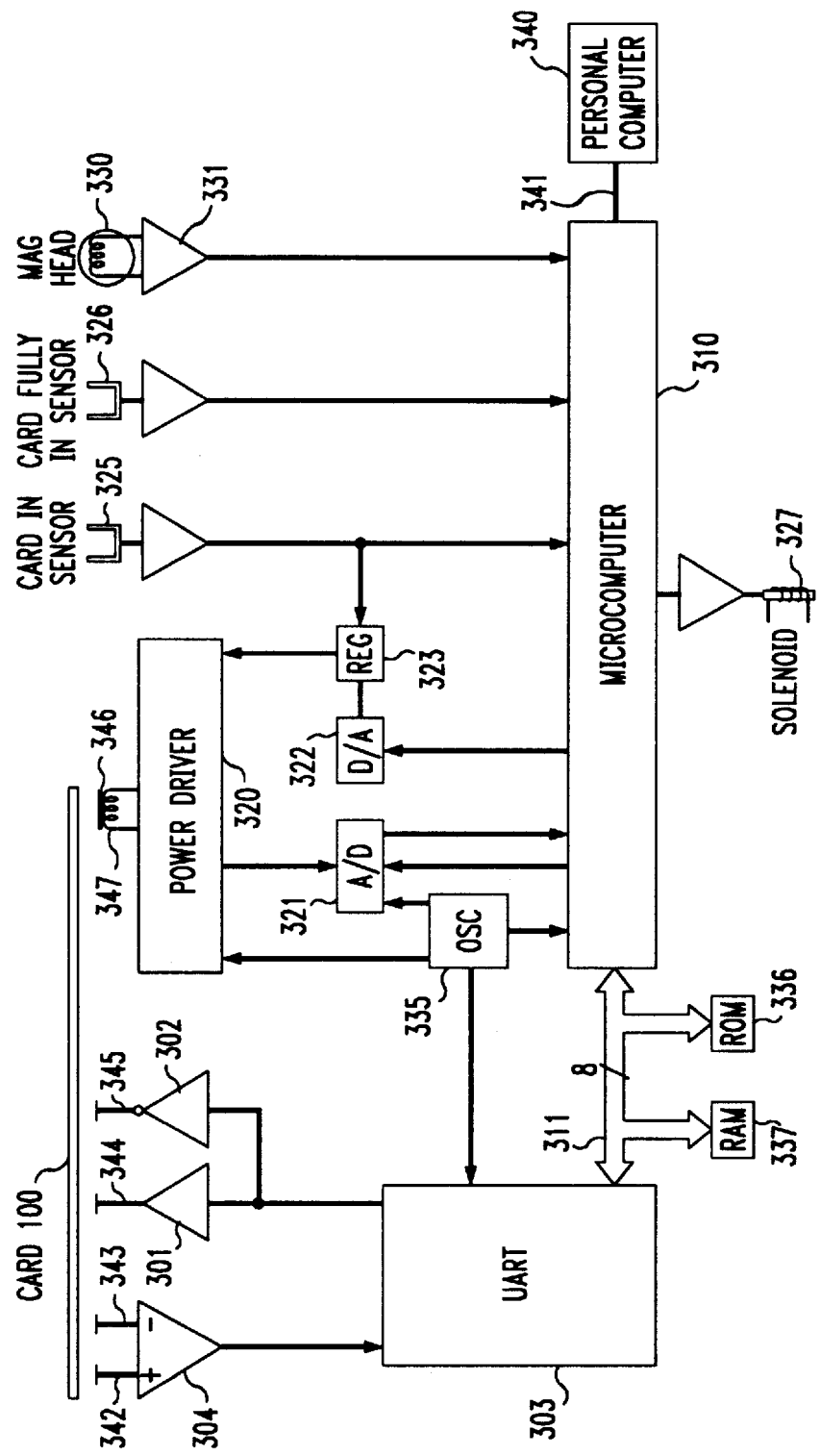
FIG. 3 illustrates, in block diagram form, the details of a smart card reader attached to a personal computer.

FIG. 1 illustrates smart card 100 in accordance with the invention. Keyboard 101 is utilized to input information into the smart card which is stored in memory 114. Display 109 is utilized to display textual information by computer 113 from memory 114. In general, the textual information stored in memory 114 is written into memory 114 via computer 113 by personal computer 340 of FIG. 3 via the smart card reader that is illustrated in FIG. 3. The reading or writing of smart card 100 via computer 113 utilizes signal interface 111. FIG. 4 illustrates, in block diagram form, the internal structure of smart card 100 of FIG. 1.

Figure 2:
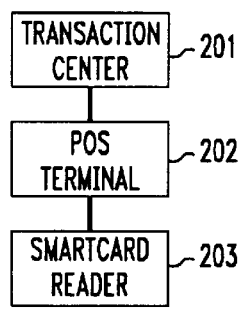
FIG. 2 illustrates, in block diagram form, the arrangement of a POS terminal with respect to a smart card reader and transaction center.

As illustrated in FIG. 2, POS terminal 202 also utilizes smart card reader 203 which is identical in construction to that illustrated in FIG. 3 to read and write smart card 100. As illustrated in FIG. 2, POS terminal 202 communicates with transaction center 201 to obtain credit card balances. With the exception of the operations performed with respect to smart card reader 203, POS terminal 202 functions in a normal manner.

The following example sets forth the manner in which card 100 is utilized. If the user has purchased groceries at a supermarket with a check, the user writes the check and activates the CHECK key on keyboard 101. Computer 113 is responsive to this activation to display the class, i.e. personal or business. If the class displayed is correct, the user activates the OK key on keyboard 101. If the class is not accurate, the user activates the BUSINESS key on keyboard 101. If the BUSINESS key is activated, the class is toggled to the other classification. Computer 113 then determines if the designated class and category are valid for a check transaction. (The designated category is from a previous transaction.) The validation consists of determining if there is a list in memory 114 for the selected class, type, and category. If the answer is no, computer 113 displays an error message in display 109 and allows the user to enter a valid category by use of the CATEGORY key which is described in the next paragraph. If a list is present, computer 113 displays the textual information defining this list. For example, if groceries was the designated category, computer 113 displays on display 109 the message "personal-check-grocery". The user responds by activating the OK key. At this point in the operations, the smart card could also be programmed to request that the user enter the check number. Computer would also store the check number in the defined list. The user hands the smart card to the sales person who would insert it into a POS terminal. The POS terminal transmits to the smart card via a smart card reader the date, payee, and amount. Computer 113 is responsive to this information that is communicated via signal interface 111 to store this information in the designated list.

If upon the designated list being displayed, the user determines that the category is not groceries, the user activates the CATEGORY key on keyboard 101. The user then enters a number via keyboard 101 defining the grocery category. Card 100 displays the textual information for the grocery list. A cash purchase is handled in a similar manner. A credit purchase of groceries is different in that the BUSINESS key is utilized to select either the individual's personal or business credit card. In addition, the POS terminal accesses the correct credit card number from card 100.

The user can also obtain the total amount of money spent in either of the two classifications or a breakdown of this information by category and/or type. For example, to obtain the amount of money spent using a credit card to purchase groceries, the user first activates the BALANCE key on keyboard 101. Computer 113 displays the total amount of money spent for the designated class. Next, the user activates the CREDIT CARD key and computer 113 displays the total amount of money spent using a credit card. To find out how much was spent for groceries, the user activates the CATEGORY key and enters the number for the grocery category. Computer 113 then displays the total money spent for groceries using the designated credit card. After activating the CATEGORY key, the user can utilize the NEXT and PREVIOUS keys to step through the lists associated with the designated class and type.

FIG. 3 illustrates a personal computer and a card unit for writing and reading information into smart card 100. The card reader is comprised of elements 303–337. These elements are described in detail in U.S. Pat. No. 4,798,722. The latter patent shows that an application station rather than personal computer 340 is communicating data with computer 310 and also shows a plurality of individual connectors for the communication of the data between the application station and microcomputer 310. In FIG. 3, personal computer 340 utilizes link 341 which is a serial link to communicate information with computer 310 and personal computer 340.

FIG. 4 illustrates, in block diagram form, smart card 100 of FIG. 1. The smart card receives power via power interface 112 which is shown in greater detail in FIG. 4 as comprising power transducer 402 and battery charger 403 and as set forth in U.S. Pat. No. 4,802,080 which is hereby incorporated by reference. Smart card 100 communicates signals with outside devices via signal interface 111 using a capacitively coupled mechanism as is set forth in U.S. Pat. No. 4,795,898 which is also hereby incorporated by reference. Computer 113 provides overall control for smart card 100. Power for smart card 100 is provided by battery 115 which is charged by an external device via interface 112. The latter interface includes power transducer 202 and battery charger 203. For each combination of class, type, and category, computer 113 maintains a list in memory 114. These lists may be link lists or any other type of list well known to those skilled in the art. These lists are initially created upon commands received via signal interface 111 from personal computer 340 as illustrated in FIG. 3. In addition, computer 113 maintains in memory 114 credit card numbers that are transmitted upon request to a POS terminal to allow credit card transactions.

Figure 5:
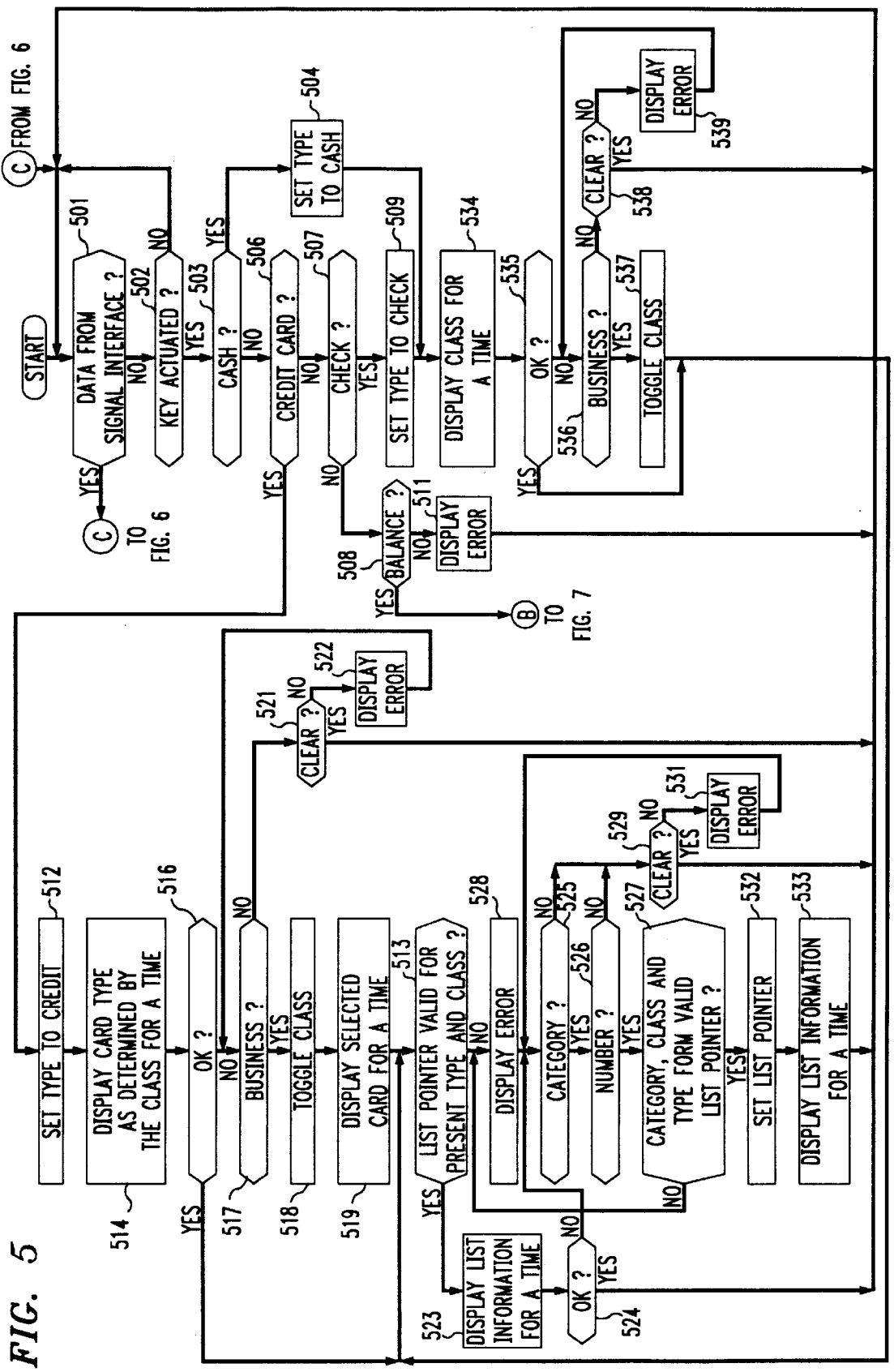
FIGS. 5, 6, and 7 illustrate the operations performed by a smart card.
Figure 6:
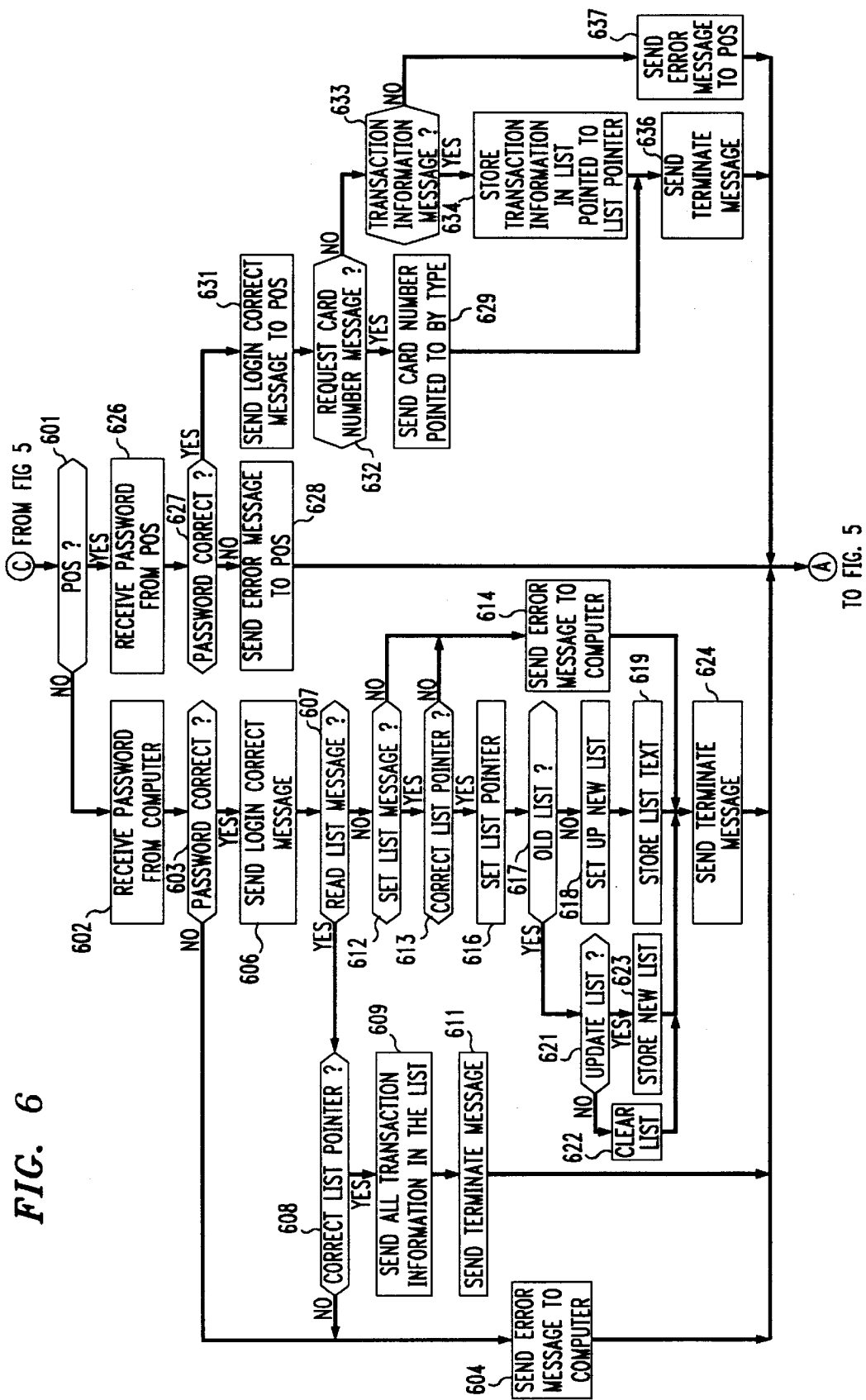
Figure 7:
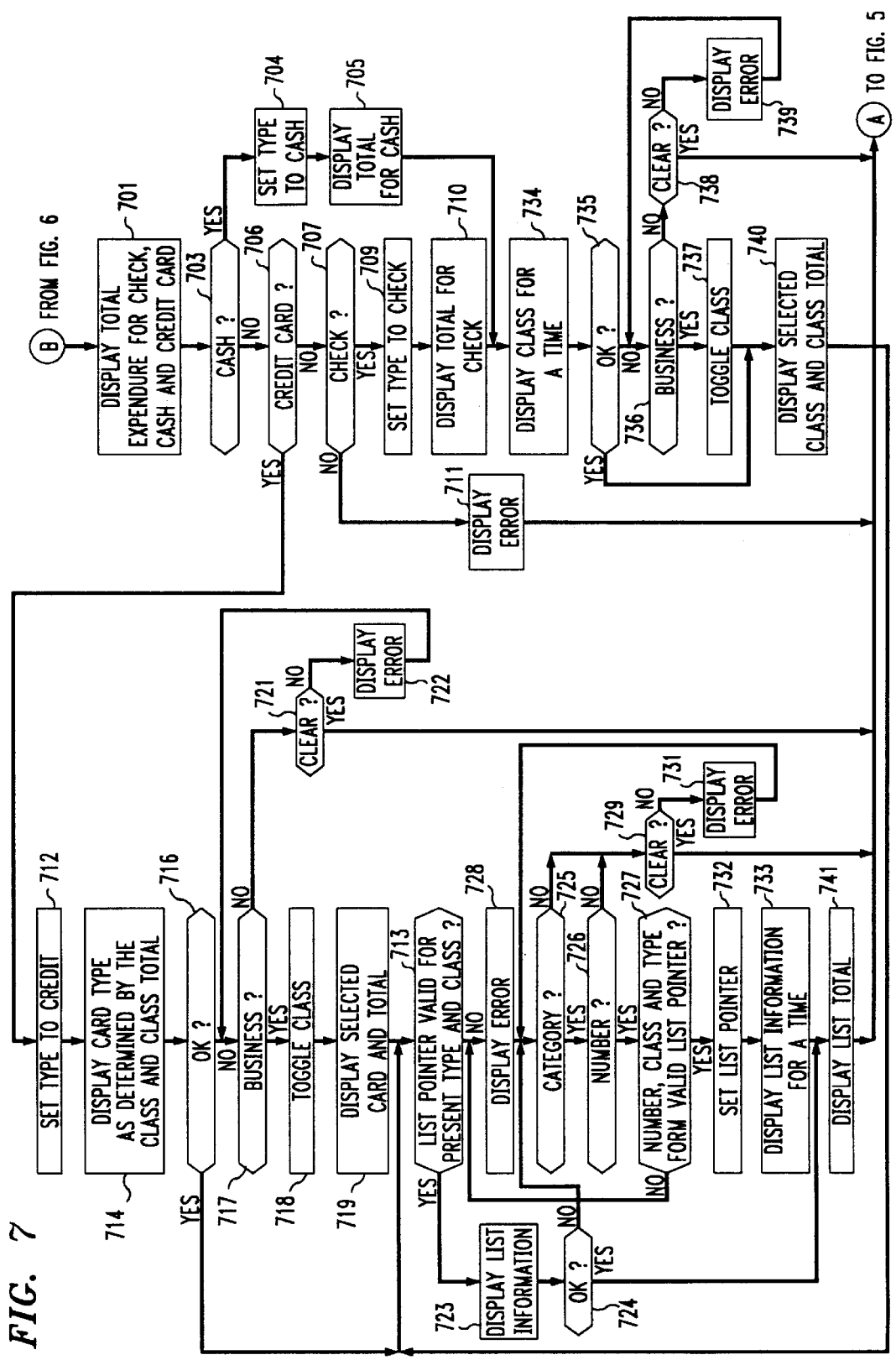

FIGS. 5, 6, and 7 illustrate, in flow chart form, the operations performed by computer 113 in responding to actuation of keys on keyboard 101, messages from POS terminal 202 of FIG. 2, or messages from personal computer 340. Computer 113 maintains in memory 114 three words which are utilized to keep track of the designated class, type, and category. These three words (class, type, and category) are utilized to form the list pointer which points to the list that is to be used for operations in smart card 100. Decision block 501 determines if data is being received by signal interface 111. If the answer is yes, control is transferred to FIG. 6 that describes the operations performed by computer 113 in response to data from either POS terminal 202 or computer 340. If the answer is no, control is transferred to decision block 502 which determines if a key has been actuated on keyboard 101. Blocks 503–533 with the exception of blocks 508 and 511, prepare smart card 100 to be used in conjunction with POS terminal 202. If the answer is no, control is transferred back to decision block 501. If the answer is yes, decision block 503 determines if the CASH key on keyboard 101 was actuated. If the answer is no, control is transferred to decision block 506.

Decision block 506 determines if the CREDIT CARD key on keyboard 101 was actuated. If the answer is yes, control is transferred to block 512 which sets the type word to credit. A credit card is a transaction card. Another type of transaction card is a debit card. One skilled in the art would readily see that the following operations could be used for debit card rather than a credit card. After execution of block 512, control is transferred to block 514 which displays the card type as determined by the class word on display 109. The present implementation is limited to two credit cards i.e., a business or personal credit card. But one skilled in the art could readily envision how to expand the operations illustrated in FIG. 5 with respect to credit cards to more than two credit cards. Block 514 displays the credit card type in order to give the user an opportunity to pick another credit card. After execution of block 514, control is transferred to decision block 516 which determines if the user has actuated the OK key on keyboard 101. If the answer is yes, control is transferred to block 513. If the answer is no, this indicates that the user wishes to either to change the class or to stop the operation by actuating the CLEAR key on keyboard 101. Decision block 517 determines if the BUSINESS key has been actuated. If the BUSINESS key has been actuated, block 518 is executed which toggles the class word. Hence, if the BUSINESS key is actuated when the class word designates business, the class word will be changed to designate personal. After execution of block 518, control is transferred to block 519 which displays the selected card for a period of time. After execution of block 519, control is transferred to block 513.

Returning to decision block 517, if the answer is no, control is transferred to decision block 521 which determines if the CLEAR key on keyboard 101 has been actuated. If the answer is yes, control is transferred back to block 501 since the user has indicated that they want to terminate the present operation. If the answer in decision block 521 is no, control is transferred to block 522 which displays an error and then after execution of block 522, control is transferred to block 517. The reason this is done is that it is assumed that the user has accidentally hit a key other than the BUSINESS key.

Returning to decision block 513 which receives control from decision block 516 or block 519, decision block 513 determines if the list pointer which is computed using the designations found in the class, type, and category words points to a valid list. If the answer is yes, control is transferred to block 523 which displays the textual list information on display 109 for the list so that the user can verify that this is the list that is to be used in operations with POS terminal 202. If the answer is yes, control is transferred back to 501 by execution of decision block 524. If the answer is no in decision block 524, control is transferred to decision block 525 which determines if the CATEGORY key has been actuated. If the answer is no, control is transferred to decision block 529. Decision block 529 and block 531 perform the same operations as were previously described for decision block 521 and block 522. If the answer in decision block 525 is yes, then control is transferred to decision block 526 to await the entry of a number. After the user has entered a number utilizing the numeric keys on keyboard 101, the user signals the end of the number by actuating the ENTER key on keyboard 101. If decision block 526 determines that a valid number has been entered, control is transferred to decision block 527 which determines if the category specified by the recently entered number, class word and type word form a valid list pointer. If the answer is no in decision block 527, control is transferred to block 528 which displays an error message and transfers control to decision block 525. Note, that the user can terminate reoccurrence of this operation by actuating the CLEAR key. If the answer is yes in decision block 527, control is transferred to block 532 which sets the list pointer equal to the pointer calculated from the category, type, and class words. Control is then transferred to 533. Block 533 displays the list information for a period of time.

Returning to decision block 503, if the answer is yes indicating that the user is going to use cash in the transaction, control is transferred to block 504 which sets the type word to designate cash and transfers control block 534 which displays the class for a period of time. Block 534 displays a class, i.e. business or personal, for a period of time giving the user the opportunity to accept this class by actuating the OK key on keyboard 101 or to actuate the BUSINESS key to toggle the class word. Decision block 535 checks to see if the OK key has been actuated. If the answer is yes, control is transferred to block 513. The operations of 513 and successive blocks have already been described. If the answer in decision block 535 is no, control is transferred to block 536 which determines if the BUSINESS key has been actuated. The operations of blocks 536–539 is identical to those performed by blocks 517, 518, 521, and 522.

Returning to decision block 506. If the answer is no, control is transferred to decision block 507 to determine if the CHECK key was actuated on keyboard 101. If the answer is yes, control is transferred to 509 which sets the type word to designate check and transfers control to block 534 whose operation has already been described. If the answer in decision block 507 is no, control is transferred to decision block 508 which determines if the BALANCE key was actuated indicating that the user wishes to examine the balances for various classes, types, or categories. If the answer in decision block 508 is yes, control is transferred to block 701 on FIG. 7.

Block 701 displays the total expenditures for all classes, types, and categories. Control is then transferred to decision block 703. Decision block 703 determines if the CASH key on keyboard 101 was actuated. If the answer is no, control is transferred to decision block 706 which determines if the CREDIT CARD key on keyboard 101 was actuated. If the answer is yes, control is transferred to block 712 which sets the type word to credit. After execution of block 712, control is transferred to block 714 which displays the card type as determined by the class word on display 109 and total balance for the class. Block 714 displays the credit card type in order to give the user an opportunity to pick another credit card. After execution of block 714, control is transferred to decision block 716 which determines if the user has actuated the OK key on keyboard 101. If the answer is yes, control is transferred to block 713. If the answer is no, this indicates that the user wishes to either to change the class or to stop the operation by actuating the CLEAR key on keyboard 101. Decision block 717 determines if the BUSINESS key has been actuated. If the BUSINESS key has been actuated, block 718 is executed which toggles the class word. Hence, if the BUSINESS key is actuated when the class word designates business, the class word will be changed to designate personal. After execution of block 718, control is transferred to block 719 which displays the selected card for a period of time and total balance for the selected credit card. After execution of block 719, control is transferred to block 713.

Returning to decision block 717, if the answer is no, control is transferred to decision block 721 which determines if the CLEAR key on keyboard 101 has been actuated.

If the answer is yes, control is transferred back to block 701 since the user has indicated that they want to terminate the present operation. If the answer in decision block 721 is no, control is transferred to block 722 which displays an error and then after execution of block 722, control is transferred to block 717. The reason this is done is that it is assumed that the user has accidentally hit a key other than the BUSINESS key.

Returning to decision block 713 which receives control from decision block 716 or block 719, decision block 713 determines if the list pointer which is computed using the designations found in the class, type, and category words points to a valid list. If the answer is yes, control is transferred to block 723 which displays the textual list information on display 109 for the list so that the user can verify that this is the list that is to be used in operations with POS terminal 202. If the answer is yes, control is transferred back to 701 by execution of decision block 724. If the answer is no in decision block 724, control is transferred to decision block 725 which determines if the CATEGORY key has been actuated. If the answer is no, control is transferred to decision block 729. Decision block 729 and block 731 perform the same operations as were previously described for decision block 721 and block 722. If the answer in decision block 725 is yes, then control is transferred to decision block 726 to await the entry of a number. After the user has entered a number utilizing the numeric keys on keyboard 101, the user signals the end of the number by actuating the ENTER key on keyboard 101. If decision block 726 determines that a valid number has been entered, control is transferred to decision block 727 which determines if the category specified by the recently entered number, class word and type word form a valid list pointer. If the answer is no in decision block 727, control is transferred to block 728 which displays an error message and transfers control to decision block 725. Note, that the user can terminate reoccurrence of this operation by actuating the CLEAR key. If the answer is yes in decision block 727, control is transferred to block 732 which sets the list pointer equal to the pointer calculated from the category, type, and class words. Control is then transferred to block 733. Block 733 displays the list information for a period of time. After execution of block 733, control is transferred to block 741 which displays the total balance for the selected list.

Returning to decision block 703, if the answer is yes indicating that the user is going to use cash in the transaction, control is transferred to block 704 which sets the type word to designate cash and transfers control to block 705. The latter block displays the total balance for the cash type for both classes and transfers control to block 734 which displays the class for a period of time. Block 734 displays a class i.e., business or personal, for a period of time giving the user the opportunity to accept this class by actuating the OK key on keyboard 101 or to actuate the BUSINESS key to toggle the class word. Decision block 735 checks to see if the OK key has been actuated. If the answer is yes, control is transferred to block 740. The operations of 713 and successive blocks have already been described. If the answer in decision block 735 is no, control is transferred to block 736 which determines if the BUSINESS key has been actuated. The operations of blocks 736–739 is identical to those performed by blocks 717, 718, 721, and 722. If block 737 is executed, block 740 is executed to display the total balance for the selected class and type. After execution of block 740, control is transferred to block 713.

Returning to decision block 706. If the answer is no, control is transferred to decision block 707 to determine if the CHECK key was actuated on keyboard 101. If the answer is yes, control is transferred to 709 which sets the type word to designate check and transfers control to block 710 which displays the total balance for all checks. After execution of block 710, control is transferred to block 734 whose operation has already been described. If the answer in decision block 707 is no, control is transferred block 711 which displays an error message and then, control is transferred to block 701.

Returning to decision block 501 on FIG. 5, if the answer is yes that data is being received from the signal interface, control is transferred to decision block 601 of FIG. 6. At the end of the accounting cycle, personal computer 340 accesses transactions from each of the lists using read list messages. Computer 340 updates its own records and transmits back to smart card 100 new balances and unreported transactions using set list messages. There are only unreported transactions for credit card and check types. Decision block 601 determines whether personal computer 340 or POS terminal 202 is transmitting data to smart card 100. The computer or POS terminal identifies itself with an initial message. If it is not the POS terminal, control is transferred to block 602 which receives the password from computer 340. Decision block 603 then determines if the password is correct. If the answer is no, an error message is sent to computer 340 by execution of block 604 and control is returned to decision block 501 of FIG. 5. If the login is correct, control is transferred to block 606 which sends a login correct message to computer 340 and transfers control to decision block 607 to await the reply from computer 340. If the computer sends a read list message, decision block 607 transfers control to decision block 608. The read list message will contain the list pointer which identifies a list in computer 340. Decision block 608 determines if the list pointer is a valid list. In other words, a list that exists in memory 114. If the answer is no, decision block 608 transfers control to block 604 which sends an error message to computer 340 and returns control to decision block 501 of FIG. 5. If the answer in decision block 608 is yes, then computer 113 sends all of the transactions in the identified list to computer 340. This transmission of transactions is in the form of a plurality of messages with the last message designating that the end of the list had been received. After all of the transactions have been transmitted by block 609, control is transferred to block 611 which sends a terminate message to computer 340 to inform it that computer 113 is ceasing communication with computer 340. After execution of block 611, control is transferred to decision block 501 of FIG. 5.

Returning to decision block 607, if the answer is no, control is transferred to decision block 612. The latter decision block determines if the message sent is a set list message. A set list message is used to update an old list, delete an old list or create a new list. If the answer is no in decision block 612, control is transferred to block 614 which sends an error message to computer 340 and transfers control to block 624 which sends a terminate message to computer 340. Returning to decision block 612, if the answer is yes, control is transferred to decision block 613 which determines if the set list message contains a valid list pointer. The determination of validity in decision block 613 is directed to whether the received list pointer is a valid old or new list. If the answer is no, control is transferred to block 614 whose operations have already been described. If the answer is yes, control is transferred to block 616 which sets the list pointer equal to the list pointer received in the set list message and control is transferred to decision block 617. Decision block 617 determines if it is a new list or an old list.

If the list already exists within memory 114, it is an old list. If the answer is yes in decision block 617, control is transferred to decision block 621. The latter block determines if the balance and transactions are to be updated and utilizes the balance and transactions transmitted in the set list message to update the balance and transactions after removing the existing transactions by execution of block 623. If the answer in decision block 621 is no, block 622 clears the list and all references to it from memory 114, thus removing the list from memory 114. After execution of either block 622 or 623, control is transferred to block 624. Returning to decision block 617. If the answer is no, computer 113 establishes a new list in memory 114 and stores the textual information in that list by execution of block 619. The textual information is received in the set list message. Finally, control is transferred to block 624.

Returning to decision block 601. If the answer is no, this indicates that POS terminal 202 is establishing communication with computer 113 via signal interface 111. Blocks 626, 627, 628, and 631 are needed when POS terminal 202 must use a password to gain access to smartcard 100. If a password is not required, decision block 601 transfers control to decision block 632 upon the result being a yes. Assuming a password is required, block 626 receives the password from POS terminal 202. Decision block 627 checks if this password is correct. If the answer is no, block 628 sends an error message to POS terminal 202 and returns control to decision block 501 of FIG. 5. If the answer is yes in decision block 627, control is transferred to block 631 which sends a login correct message to POS terminal 202. Decision block 632 awaits a message from POS terminal 202 and tests if this message is a request for a credit card number message. The credit card number that is transmitted was determined by the user in responding to blocks 513–519 of FIG. 5. If it is a request for the card number, block 629 is executed which sends the card number pointed to by the class word which was set in the previously designated blocks of FIG. 5 in this paragraph. If decision block 632 determines that it is not a request for the card number, control is transferred to decision block 633 to determine if it is a transaction information message. This type of message contains the date, payee, and the amount of the transaction. If it is not a transaction information message, control is transferred to block 637 which sends an error message to POS terminal 202. If it is a transaction information message, control is transmitted to block 634 which stores this information in the list designated by the list pointer as determined by blocks 513–533 of FIG. 5. After storage of the transaction information, control is transferred to block 636 which sends a termination message to POS terminal 202.

Figure 8:
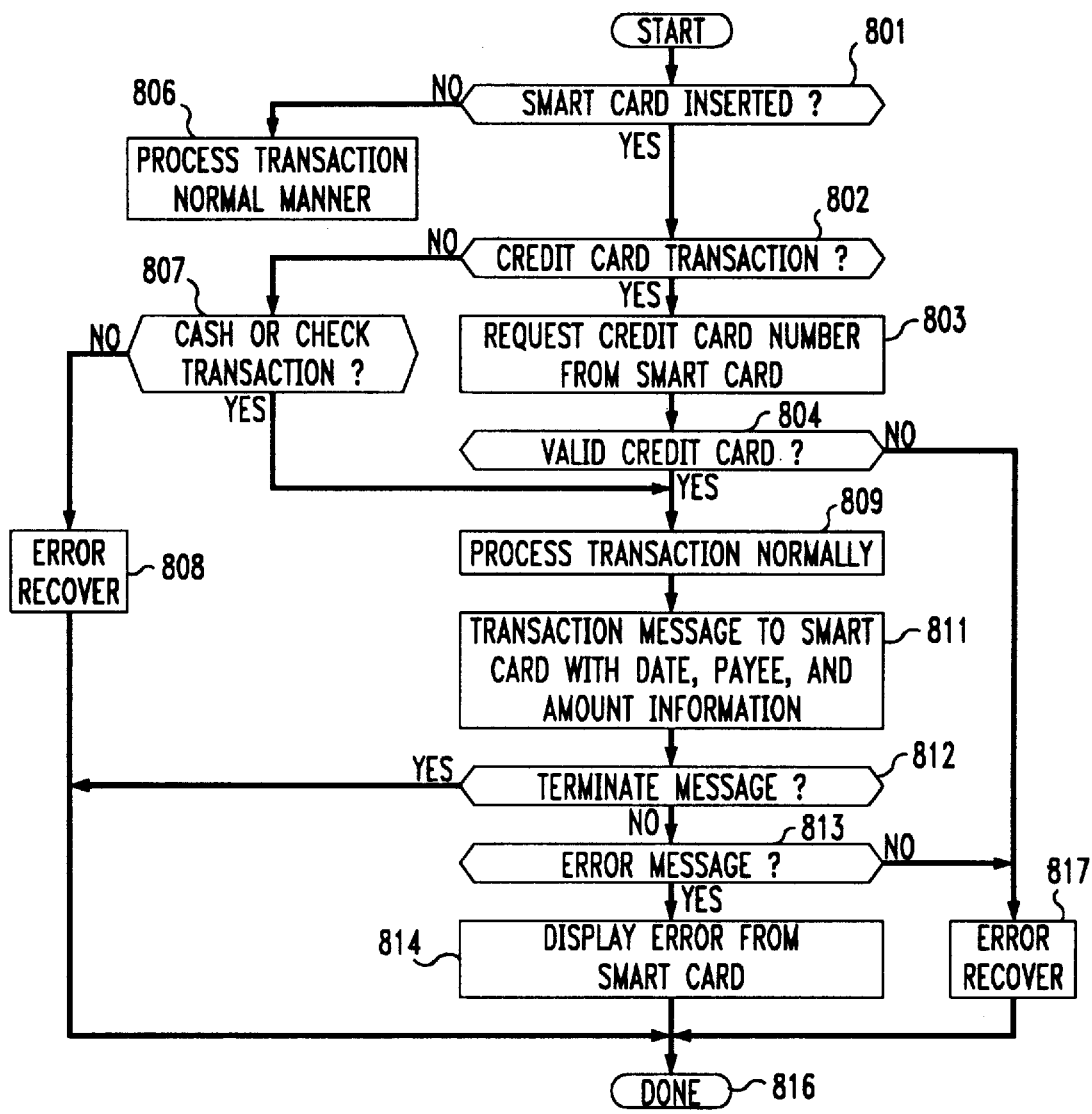
FIG. 8 illustrates, in flow chart form, the operations performed by a POS terminal in writing the class, type, and category information into a smart card.

FIG. 8 illustrates in flow chart form, the operations performed by POS terminal 202 with respect to smart card 100. First, decision block 801 determines whether a smart card has been inserted into POS terminal 202. If the answer is no, control is transferred to 806 for normal processing. If the answer is yes, control is transferred to decision block 802. The latter decision block determines if POS terminal 202 is performing a credit card type transaction. If the answer is no, POS terminal 202 determines if it a cash or check transaction. If the answer is no, control is transferred to block 808 for error recovery. If the answer is yes, control is transferred to block 809. Returning to decision block 802, if the answer is yes, control is transferred to block 803, which requests the credit card number from smart card 100. Decision block 804 determines if the credit card number is valid by POS terminal 202 transmitting messages to transaction center 201. If it is not a valid credit card, control is transferred to block 817 for error recovery. If it is a valid credit card, control is transferred to 809 which does the normal transaction processing such as printing a bill and updating internal values within POS terminal 202 and transaction center 201. After execution of block 809, block 811 transmits a transaction message to smart card 100 including the date, payee, and amount of the transaction. Decision block 812 is executed to await the arrival of a message. When a message arrives, decision block 812 transfers control to block 816 if the message is a terminate message. If the answer is no, control is transferred to decision block 813 which tests if the received message is an error message. If the answer is no, control is transferred to block 817 for error recovery. If the answer is yes in decision block 813, control is transferred to block 814 which displays an error from smart card message on POS terminal 202. After execution of block 814, control is transferred to block 816.

Figure 9:
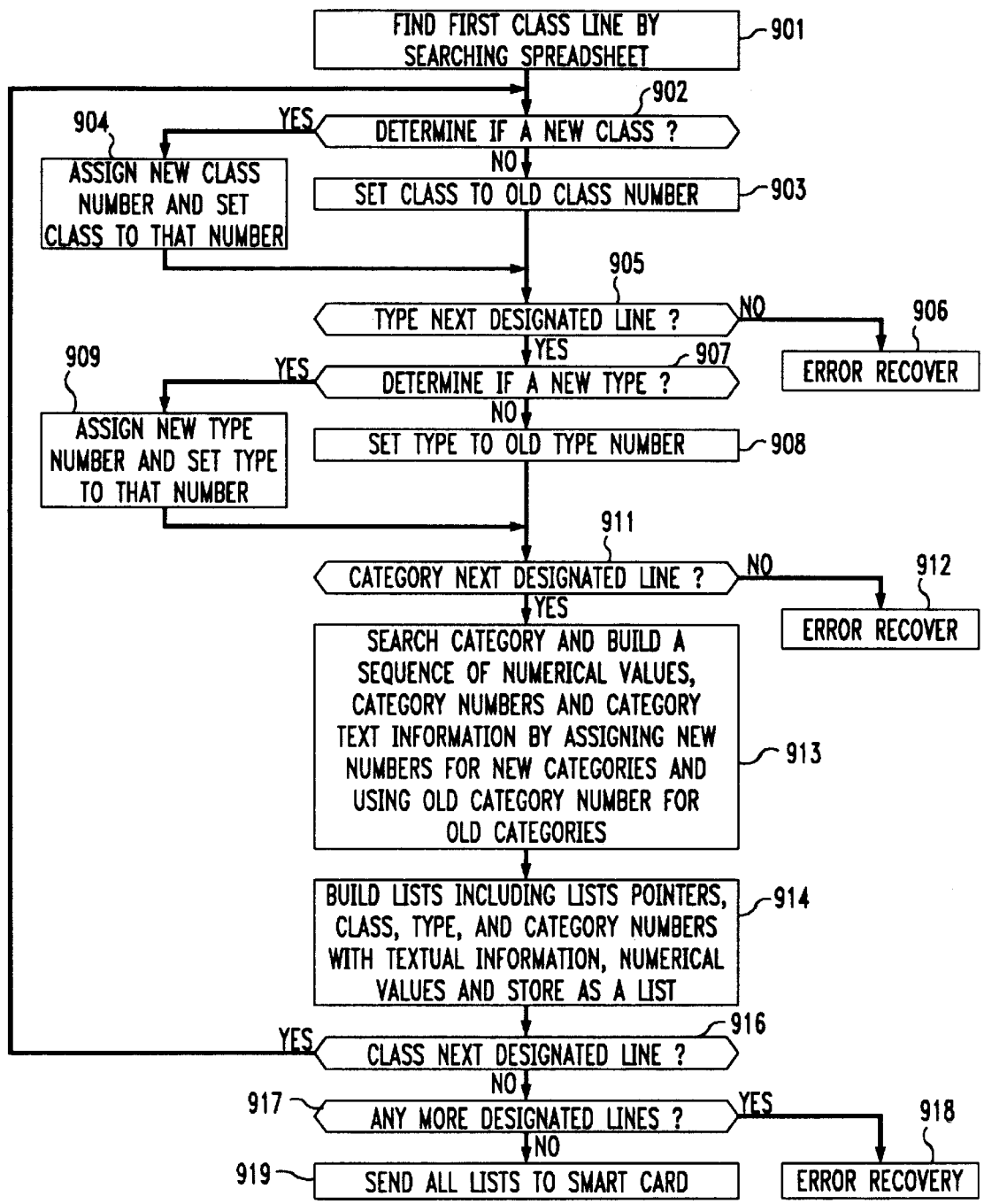
FIG. 9 illustrates the operations performed by a personal computer in obtaining spreadsheet information to be transferred to a smart card.
Figure 10:
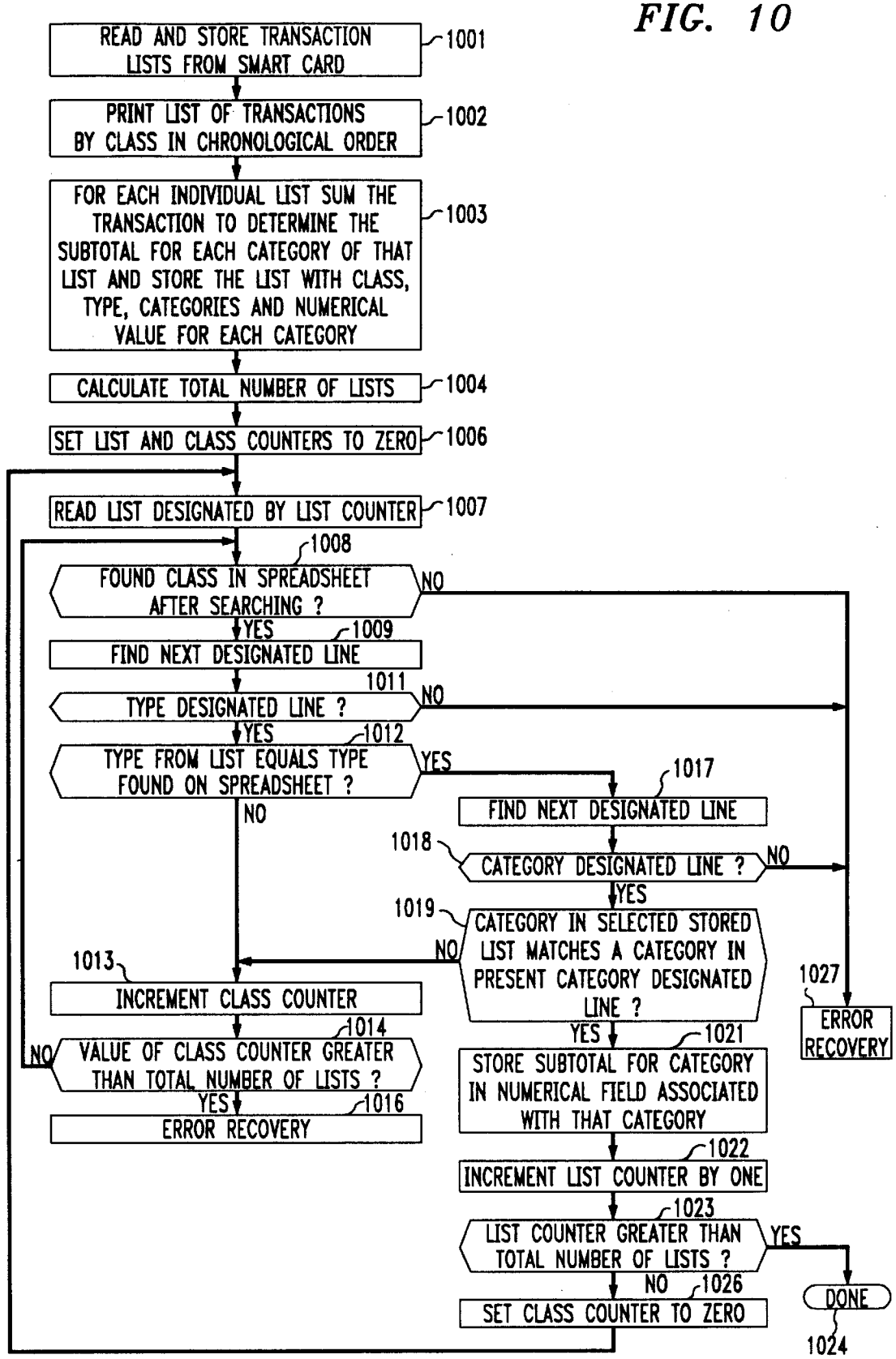
FIG. 10 illustrates the operations performed by a personal computer in updating a spreadsheet with information from a smart card.

FIG. 9 illustrates the operations performed by personal computer 340 of FIG. 3 to obtain the list information including class, type, category, and numeric values for categories, from a spreadsheet. FIG. 10 illustrates the operations performed by personal computer 340 for obtaining list information from smart card 100 and then inserting the list information into a spreadsheet. FIG. 13 illustrates a sample spreadsheet that advantageously could be prepared using the Microsoft Excel® spreadsheet program. FIG. 14 illustrates the contents of a file representing the spreadsheet of FIG. 13 that was stored using the Excel spreadsheet program with the CSV (comma-separated values) protocol. This protocol can also be read by the Excel spreadsheet program and subsequently stored in the normal Excel protocol. Lines 1301 through 1304 of FIG. 13 correspond to lines 1401–1404 of FIG. 4, respectively. As can be seen from FIG. 14, the columns of FIG. 13 are shown as being separated by commas. For example, line 1403 shows the columns of line 1303 by the utilization of commas. Similarly, the numeric values of line 1304 can be easily found in line 1404 by counting commas to obtain the right column.

To set up the list in smart card 100, personal computer 340 performs the operations illustrated in FIG. 9. First the spreadsheet of FIG. 14 is searched from the first line to the last line looking for the first class line. A class line, such as line 1401, is designated by three "#". A type line, such as line 1402, is designated by two "#", and a category designated line is designated by each category having only one "#". In addition, computer 340 maintains a table for the class, type, and categories which list the textual information for each with a unique number. These numbers are catenated to form the list pointer for each list. First, block 901 is executed to find the first class line of the spreadsheet. Next, the table of class numbers is searched to determine if this is a new class by decision block 902. If the answer is no, block 903 is executed which sets the class word equal to the old class number. If the answer is yes in decision block 902, block 904 assigns a new class number and sets the class word to that number. In addition, block 904 enters the new class number along with the textual information into the class table.

After execution of block 903 or 904, decision block 905 is executed. Decision block 905 searches for the next designated line. If this next designated line is not a type line then control is transferred to block 906 for error recovery. For example, if line 1401 was found in decision block 902, the next designated line has to be line 1402. Note, that the spreadsheet may have comments or numerical data or formulas inserted in the spreadsheet between the class designated line and the type designated line. If the answer in decision block 905 is yes, control is transferred to decision block 907 which determines if it is an old or new type. If the type is found in the type table, control is transferred to block 908, and the type word is set equal to the type number in the type table. Returning to decision block 907, if the answer is yes, control is transferred to block 909 which assigns a new type number to the type and sets the type word to that number. In addition, the textual information and the type number are added to the type table.

After execution of either block 908 or 909, control is transferred to decision block 911. The latter decision block determines if the next designated line is a category designated line. If the answer is no, control is transferred to block 912 for error recovery. If the answer is yes, control is transferred to block 913 which searches through the category designated line and the associated numerical value lines, lines 1403 and 1404, and builds sets of information with each set having class, type and category numbers, category textual information, and a numerical value by using the category table and assigning new categories as required. After execution of block 913, control is transferred to block 914 which builds lists out of the sets of information derived in block 913. Note, that the list pointer is now computed by catenating the numbers in the class, type, category words. Note that there is one list built for each category.

After execution of block 914, control is transferred to decision block 916 which checks to see if class is the next designated line. If the answer is yes, control is transferred back to decision block 902. If the answer is no, control is transferred to decision block 918 which determines if there are any more designated lines. If the answer is yes, control is transferred to block 918 for error recovery. Since the next designated line that should appear in the spreadsheet after a category designated line is a class designated line. If the answer in decision block 917 is no, control is transferred to block 919 for the transmission of the lists to smart card 100.

FIG. 10 reads the transaction lists from smart card 100 and inserts subtotals for each category by class and type into the spreadsheet illustrated in FIG. 13 by manipulating the file illustrated in FIG. 14. First, computer 340 of FIG. 3 reads and stores the transactions lists from smart card 100 by execution of block 1001. Block 1002 then prints a list of the transactions in chronological order by class. This results in the user of computer 340 having a printout of all transactions made by, for example, the personal credit card. Next, block 1003 sums the transactions for each list coming up with a single numerical value for each category of an individual list. These lists are then stored.

Block 1004 then calculates the total number of lists. Block 1006 sets a list and class counters to zero. Block 1007 reads the list designated by the list counter (after execution of block 1006 this will be the first list). Block 1008 then searches for the class designated in the access list through the spreadsheet. If the class is not found, then an error has occurred, and control is transferred to error recovery block 1027. If the class is found, control is transferred to block 1009 which finds the next designated line which should be a type designated line. Decision block 1011 tests to ascertain whether the next designated line was a type designated line. If the answer is no, control is transferred to block 1027 for error recovery. If the answer is yes, control is transferred to decision block 1012 which determines if the type in the type designated line equals the type of the list currently being processed. If the answer is no, block 1013 increments the class counter, and decision block 1014 ascertains whether the value of the class counter is greater than the total number of lists. If the answer is no, control is transferred back to decision block 1008 which searches the spreadsheet for another class. If the answer in decision block 1014 is yes, control is transferred to block 1016 for error recovery.

Returning to decision block 1012, if the answer is yes, control is transferred to block 1017 which finds the next designated line. Decision block 1018 then ascertains whether the next designated line is a category designated line. If the answer is no, control is transferred to block 1027 for error recovery. If the answer is yes, control is transferred to decision block 1019. The latter decision block searches the selected category designated line to find the category of the stored list. If the designated category line does not contain the category, control is transferred to block 1013 which has been previously described. If the answer is yes, block 1021 stores the subtotal in the numerical field of FIG. 14 associated with the selected category. Next, block 1022 increments the list counter by one and transfers control to decision block 1003. Block 1003 checks to see whether the list counter is greater than the total number of lists. If the answer is yes, the processing is done. If the answer is no, control is transferred to block 1026 which sets the class counter to zero and transfers control back to block 1007.

A second implementation of the invention utilizes smart cards that do not have a display 109 or keyboard 101. This second implementation envisions that a user would have a smart card for personal use and a smart card for business purposes. However, one skilled in the art could readily envision how to combine both personal and business transactions in such a card. In making a transaction with such a smart card, the user will inform the operator of the POS terminal of the category of the transaction by dictating a number to the operator. The operator will then enter this category number into the POS terminal and at the appropriate time the POS terminal transmits to the smart card a transaction message that comprises the category number, type of transaction, date, payee, and amount information. The type of transaction information is routinely entered by the operator of the POS terminal; hence, the POS terminal has the type of transaction information. In order to include more than one class, i.e., business or personal, into a single smart card of the second implementation, the user would dictate to the operator a number designating the class. After the operator entered the class number, the POS terminal would transmit this class number also in the transaction message.

Figure 11:
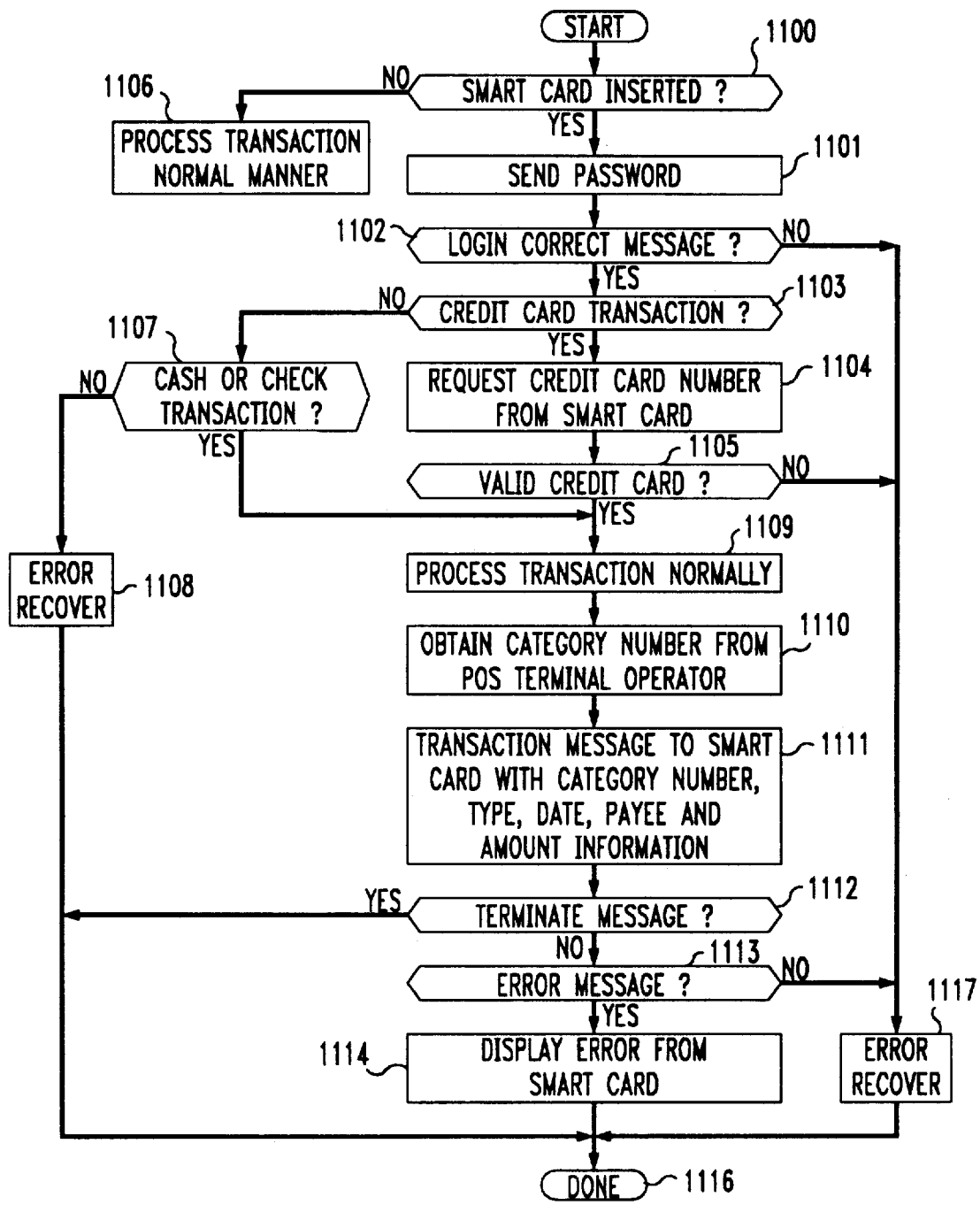
FIG. 11 illustrates, in flow chart form, the operations performed by a POS terminal with respect to the second implementation.

FIG. 11 illustrates, in flow chart form, the operations performed by a POS terminal in the second implementation of the invention. At the start of the transaction, the POS terminal determines if a smart card has been inserted into the POS terminal by execution of decision block 1101. If the answer is no, block 1106 is executed which performs normal transaction processing. If the answer is yes, block 1101 is executed to transmit the password to the smart card. Decision block 1102 awaits for the login correct message from the smart card. If a message other than the login correct message is received, error recovery is performed by block 1117. If the login correct message is received, decision block 1103 determines if the transaction involves a credit card. If the answer is no, decision block 1107 determines if it is a cash or check transaction. If the answer is no, error recovery is performed by 1108. If the answer to decision block 1107 is yes, control is transferred to block 1109. Returning to decision block 1103, if the answer is yes, the POS terminal requests the credit card number from the smart card by execution of block 1104 and control is transferred to decision block 1105. The latter decision block determines if the credit card is a valid credit card by communicating with the transaction center. If the answer is no, control is transferred to block 1117 for error recovery. If the answer is yes, control is transferred to block 1109 for normal processing. After execution of block 1109, block 1110 requests that the POS terminal operator enter a number specifying the category. The operator obtains this number from the user of the smart card. Next, block 1111 transmits a transaction message to the smart card which comprises the category number, type of the transaction, date, payee, and amount information. Decision block 112 is executed next and awaits for the terminate message from the smart card. If the terminate message is received, control is transferred to block 1116 which ends the transaction. If a message other than the terminate message is received, control is transferred to decision block 1113 which determines if an error message was received from the smart card. If the answer is no, control is transferred to block 1117 for error recovery. If the answer is yes, block 1114 displays a message indicating that an error was received from the smart card. Next, control is transferred to block 1116.

Figure 12:
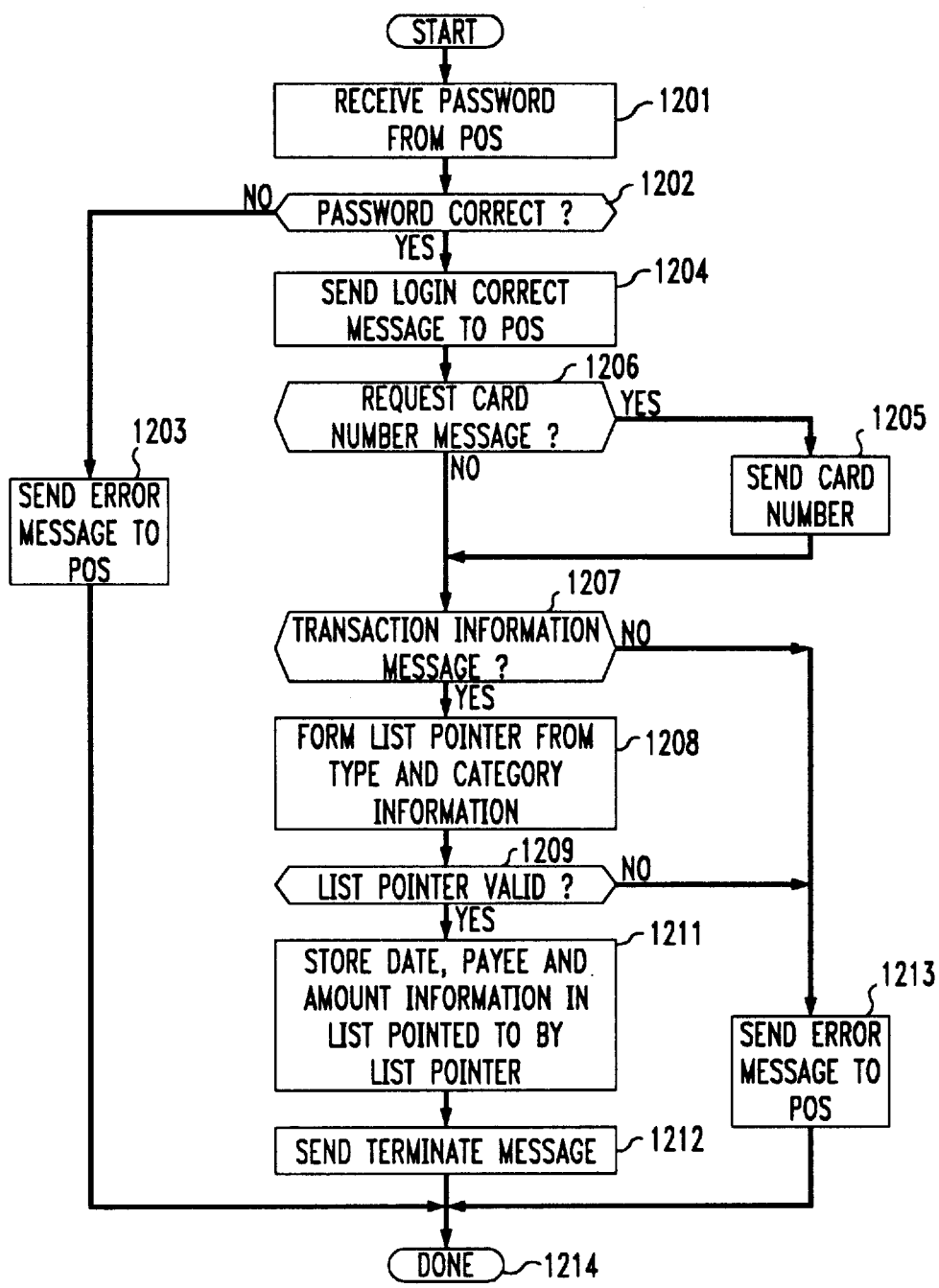
FIG. 12 illustrates, in flow chart form, the operations performed by a smart card in the second implementation.

FIG. 12 illustrates, in flow chart form, the operations performed by a smart card in the second implementation of the invention. Block 1201 receives the password from the POS terminal and transfers control to decision block 1202. The latter decision block determines if the password is correct. If the answer is no, control is transferred to block 1203 which sends an error message to the POS terminal. If the answer in decision block 1202 is yes, control is transferred to block 1204 which transmits a login correct message to the POS terminal. Decision block 1206 determines if the next message is a request for the credit card number. If the answer is yes, control is transferred to block 1205 which transmits the credit card number to the POS terminal and transfers control to block 1207. Returning to decision block 1206, if the answer is no, control is transferred to decision block 1207 which awaits for a transaction information message from the POS terminal. If the next received message is not a transaction information message, control is transferred to block 1213 by decision block 1207 in order to send an error message to the POS terminal. If a transaction information message is received, control is transferred to block 1208 which forms a list pointer from the type and category information. Next, decision block 1209 determines whether the list pointer is valid. If the list pointer is not valid, control is transferred to block 1213. If the list pointer is valid, block 1211 is executed to store the date, payee, and amount transaction information in the list pointed to by the list pointer. Block 1212 is executed to send the terminate message to the POS terminal and processing is concluded by execution of block 1214.

It is to be understood that the above-described embodiments merely are illustrative of the principles of the invention and that arrangements may be devised by those skilled in the art without departing from the spirit and scope of the invention.

We claim:

1. A smartcard for automatically storing transaction information by financial identities, comprising:

a keyboard for user inputs;

a signal interface for receiving transaction information;

a memory;

a display;

a controller responsive to a computer which reads the financial identities and textual information from an internally stored spreadsheet before transferring them along with numbers specifying lists to the controller;

the controller forming the lists in the memory in response to the textual information and financial identities transferred via the signal interface wherein the financial identities are classes, types, and categories;

the controller, responsive to the financial identities and the transaction information received from the keyboard, identifying the list;

the controller, responsive to the transaction information received, processing the transaction information and storing the processed transaction information in the identified list as list information; and the controller, further responsive to requests from the computer, transmitting the list information to the computer, and the computer responsive to the list information, storing the list information into the spreadsheet.

2. The smartcard of claim 1 wherein the computer, further responsive to the lists, forms the transactions in chronical order.

3. A smartcard for automatically storing transaction information by financial identities, comprising:

a signal interface for receiving the transaction information;

a memory;

a controller responsive to a computer which reads the financial identities and textual information from an internally stored spreadsheet before transferring them along with numbers specifying the lists to the controller;

the controller forming lists in the memory in response to the textual information and financial identities transferred via the signal interface wherein the financial identities are classes, types, and categories;

the controller, responsive to the transaction information and list number received from the transaction terminal, processing the transaction information and storing the processed transaction information in a list specified by the list number; and the controller, further responsive to requests from the computer, transmitting the lists to the computer, and the computer responsive to the lists, storing the list information into the spreadsheet.

4. The smartcard of claim 3 wherein the computer, further responsive to the lists, forms the transactions in chronical order.

5. A method for automatically storing transaction information by financial identities, comprising:

receiving user inputs from a keyboard of a smartcard;

receiving transaction information from a transaction terminal;

transferring the financial identities and textual information along with numbers specifying lists to a controller of the smartcard by a computer that reads them from an internally stored spreadsheet;

forming the lists in a memory of the smartcard in response to the textual information and financial identities transferred from the computer via the signal interface wherein the financial identities are classes, types, and categories;

identifying a list in response to financial identities information received from the keyboard;

processing the transaction information and storing the processed transaction information in the identified list in response to the transaction information received from the transaction terminal as list information; and transmitting the list information to the computer in response to requests from the computer and storing the list information into the spreadsheet by the computer in response to the list information.

6. The method of claim 5 further comprising the step of forming the transactions in chronical order by the computer in response to the lists.

7. A method for automatically storing transaction information by financial identities, comprising the steps of:

transferring to a smartcard the financial identities and textual information along with numbers specifying lists by a computer that reads the financial identities from an internally stored spreadsheet;

receiving by the smartcard the transaction information from a transaction terminal;

forming lists in a memory of the smartcard in response to the textual information and financial identities categories transferred from a computer wherein the financial identities are classes, types, and categories;

processing the transaction information and storing the processed transaction information in a list specified by a list number in response to the transaction information and the list number being received from the transaction terminal; and further transmitting the lists from the smartcard to the computer in response to requests from the computer and storing the list information into the spreadsheet by the computer in response to the lists.

8. The method of claim 7 further comprising the step of forming the transactions in chronical order by the computer in response to the lists.

* * * * *